United States Patent [19]

Eitel

[11] 4,110,013

[45] Aug. 29, 1978

[54] LIGHTWEIGHT COOLED LASER MIRROR

[75] Inventor: Fredrick G. Eitel, North Palm Beach, Fla.

[73] Assignee: United Technologies Corporation, Hartford, Conn.

[21] Appl. No.: 787,243

[22] Filed: Apr. 13, 1977

[51] Int. Cl.² ............................................. G02B 5/08
[52] U.S. Cl. .................................... 350/310; 350/288
[58] Field of Search .............................. 350/288, 310

[56] References Cited

U.S. PATENT DOCUMENTS

| | | | |
|---|---|---|---|
| 3,708,223 | 1/1973 | Sorensen et al. | 350/310 |
| 3,884,558 | 5/1975 | Dunn et al. | 350/310 |
| 3,909,118 | 9/1975 | Schmidt | 350/288 X |

Primary Examiner—F. L. Evans
Attorney, Agent, or Firm—Jack N. McCarthy

[57] ABSTRACT

A lightweight cooled laser mirror wherein a sandwich-type cylindrical face plate assembly is brazed to a rear closure plate by a metal substrate formed by a bundle of metal tubes. Inlet and outlet coolant manifolds connect the face plate assembly to the rear closure plate and provide for a coolant flow through the face plate assembly. The face plate assembly is of a brazed construction wherein the flow passes in series across the plates and then returns directly through said plates to an outlet. A manifold section on diametrically opposed edges of the face plate assembly is constructed so that equal total pressure loss occurs through all passages through the laser mirror between openings 30 and openings 32.

5 Claims, 2 Drawing Figures

LIGHTWEIGHT COOLED LASER MIRROR

BACKGROUND OF THE INVENTION

Prior art patents directed to cooled laser mirrors are U.S. Pat. Nos. 3,637,296; 3,854,799; 4,006,972 and 4,006,973.

SUMMARY OF THE INVENTION

The primary object of this present invention is to provide an all metal cooled mirror of lightweight construction while reducing thermal distortion and not compromising coolant pressure loss. In accordance with the present invention, the mirror is formed of a solid brazed construction.

DESCRIPTION OF THE PREFERRED EMBODIMENT

Figure 1:
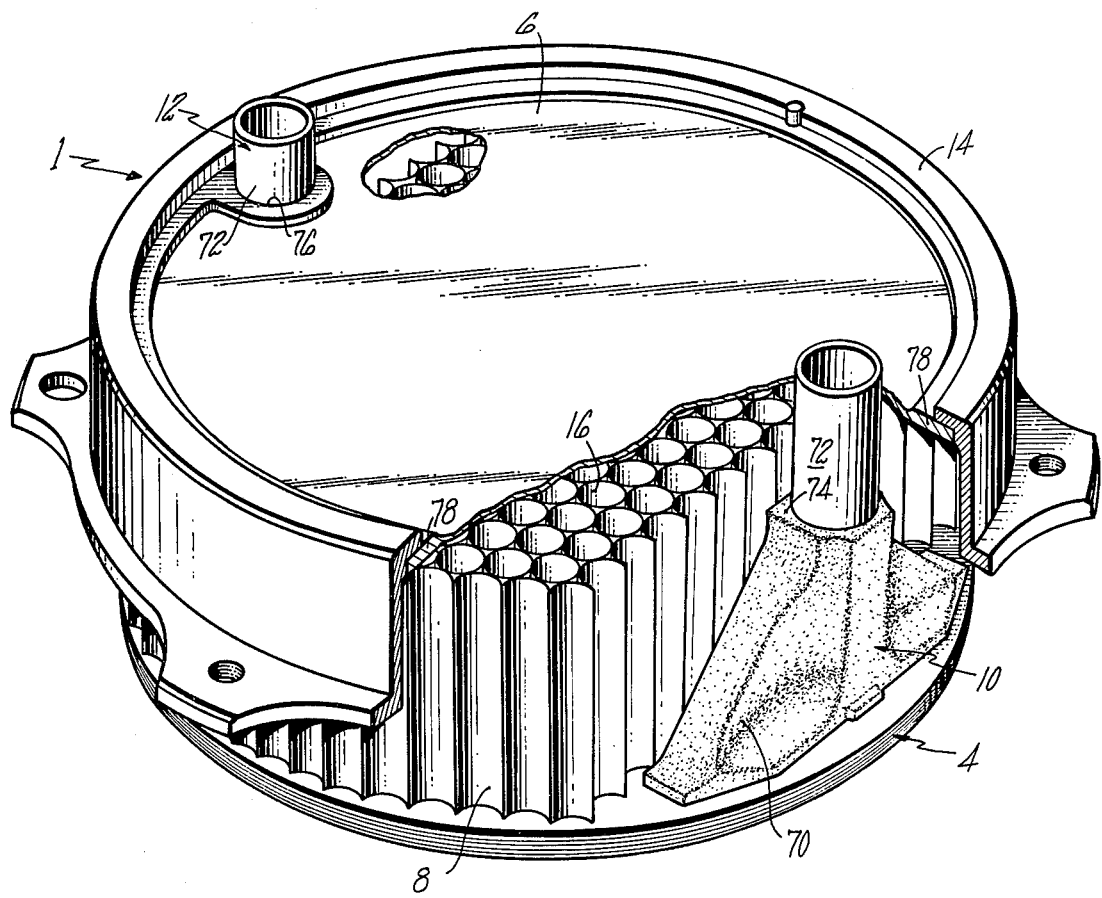
FIG. 1 is a perspective view of the laser mirror with sections broken away to show the construction.

The laser mirror 1 is comprised of five main parts: (1) a cylindrical face plate assembly 4; (2) a cylindrical rear closure plate 6; (3) a metal substrate formed of a tube bundle construction 8; (4) coolant manifolds 10 and 12; and (5) a mount ring 14.

A metal substrate is formed of individual stacked tubes 16 which are contacting along their length and brazed together as a unit. The tube bundle construction 8 is brazed at one end of the tubes 16 to the inner side of the closure plate 6 and at the other end of the tubes 16 to the inner side of face plate assembly 4. While the tube bundle construction 8 is generally cylindrical, conforming to the cylindrical closure plate 6 and face plate assembly 4, at two peripheral locations diametrically opposed sides are flat, forming open spaces between the closure plate 6 and face plate assembly 4, receiving the coolant manifolds 10 and 12 in a manner to be hereinafter described.

The face plate assembly 4 comprises a sandwich construction of five plates, mounting plate 20; three intermediate plates 22, 24 and 26; and a face plate 28. The mounting plate 20, which is flat on both sides, has seven openings 30 on one side thereof and seven openings 32 located diametrically opposed thereto. These openings fall within the open spaces on each side of the tube bundle 16 for a purpose to be hereinafter described. The next adjacent plate 22 has a flat side (not shown) which mates with one flat side of the mounting plate 20. The plate 22 also has seven openings 34 and 36 which mate with the openings 30 and 32, respectively, of the mounting plate 20 when the plates are assembled. The opposite side of plate 22 is formed having a first etched manifold section 38 at one peripheral location and a second etched manifold section 40 at a peripheral location diametrically therefrom. These manifold sections are formed by etching crossing grooves leaving portions of the plate upstanding for a purpose to be hereinafter described. The manifold sections cover an area including the openings 34 and 36.

The adjacent face of plate 24 is formed having a third etched manifold section 42 and a fourth etched manifold section 44 which are formed in a matching manner, with portions or lands upstanding, for mating with the manifold sections 38 and 40, respectively, of plate 22 when the plates are assembled. The upstanding portions of manifold sections 38 and 40 contact the upstanding portions of mating manifold sections 42 and 44 for supporting the plates 22 and 24. The plate 24 is formed with a plurality of grooves 46 extending from the manifold section 42 to an elongated slot means 48 which extends through the plate 24 and is spaced from the manifold section 44. A second elongated slot means 50, which also extends through the plate 24, and is spaced from elongated slot means 48, is connected to the inner edge of the manifold section 44. The other side of the plate 24 is flat (not shown). Each of the two manifolds formed by (1) manifold section 38 and manifold section 42 and (2) manifold section 40 and manifold section 44 have the etched passages across the face thereof formed so that the pressure loss from the openings 30 to the openings 32 is the same regardless of the coolant path taken through the laser mirror, including the grooves 46, 56 and 58 of different lengths. When the pressure loss through a specific passage is less than another passage, the loss through the manifold to the passage having the smaller pressure loss, is made greater. In other words, the total pressure loss through the manifold is controlled so that it combines with the pressure loss through each of the passages to arrive at equal total pressure losses through the laser mirror regardless of the coolant path.

The adjacent face of plate 26 is formed having a third elongated slot means 52 which extends through the plate 26 and mates with the second elongated slot means 50 of the plate 24. Diametrically opposed from the third elongated slot means 52 is a fourth elongated slot means 54 which extends through the plate 26. A plurality of grooves 56 are connected at one end to the fourth elongated slot means 54 and extend across the plate to a point adjacent the third elongated slot means 52. The free ends of the grooves 56 are elongated so that they contact elongated slot means 48 when the plates are assembled. The other side of the plate 26 is flat (not shown).

The adjacent face of plate 28 is formed having a plurality of grooves 58 extending across the face thereof. These grooves 58 are of such a length so that when the plates are assembled, the grooves are connected at one end to the third elongated slot means 52 while the other ends of the grooves 58 are connected to the fourth elongated slot means 54. The other side of the plate 28 is flat (not shown) and is formed as a reflecting surface similar to the other patents set forth above.

The five plates are all brazed together, providing the face plate assembly 4. As set forth above, the upstanding portions, or lands, of the plates 22 and 24, are brazed to prevent "ballooning" of the plates under coolant pressure.

Coolant manifolds 10 and 12 are identically formed having one portion 70 located between face plate assembly 4 and rear closure plate 6 and a short cylindrical portion 72 extending from one end of portion 70 through closure plate 6. The portion 70 is triangular-shaped with one side having seven inlets which cooperate with a set of seven openings on the free face of plate 20. The other two sides angle towards a flat surface 74 from which the short cylindrical portion 72 extends. The rear closure plate 6 has diametrically opposed openings 76 which fit over the two short cylindrical portions 72 with the closure plate 6 resting on the two flat surfaces 74. The circumference of the closure plate is made thicker at 78 for rigidity and the thickened portion extends around the two cylindrical portions 72. The interior of the portions 70 includes passageways leading from the seven holes (not shown) which cooperate with the seven openings 30 which angle into a single opening which connects with the short cylindrical portion 72. One cylindrical portion 72 comprises the inlet for the coolant fluid and has the seven openings of the cooperating portions 70 connected to the openings 30, and the other short cylindrical portion 72 comprises the outlet for the coolant fluid and has the seven openings of the coolant portions 70 connected to the openings 32.

The face of each of the portions 70 around the seven openings of the coolant manifolds 10 and 11 are brazed to the plate 20 of the face plate assembly 4 and the closure plate 6 is brazed to the flat surfaces 74 around the cylindrical portions 72 as well as to the tops of the tube bundle construction 8. A mount ring 14 is fixed to the closure plate 6 by a shrink fit. In a construction built, the first four main parts of the laser mirror 1, the plate assembly 4, the closure plate 6, the tube bundle construction 8 and the coolant manifolds 10 and 12 are all brazed together to form an integral structure. Molybedenum was used for all of these parts. The mount ring, while being shrunk on the closure plate 6, is also pinned in place to permit proper locating of the two parts.

Figure 2:
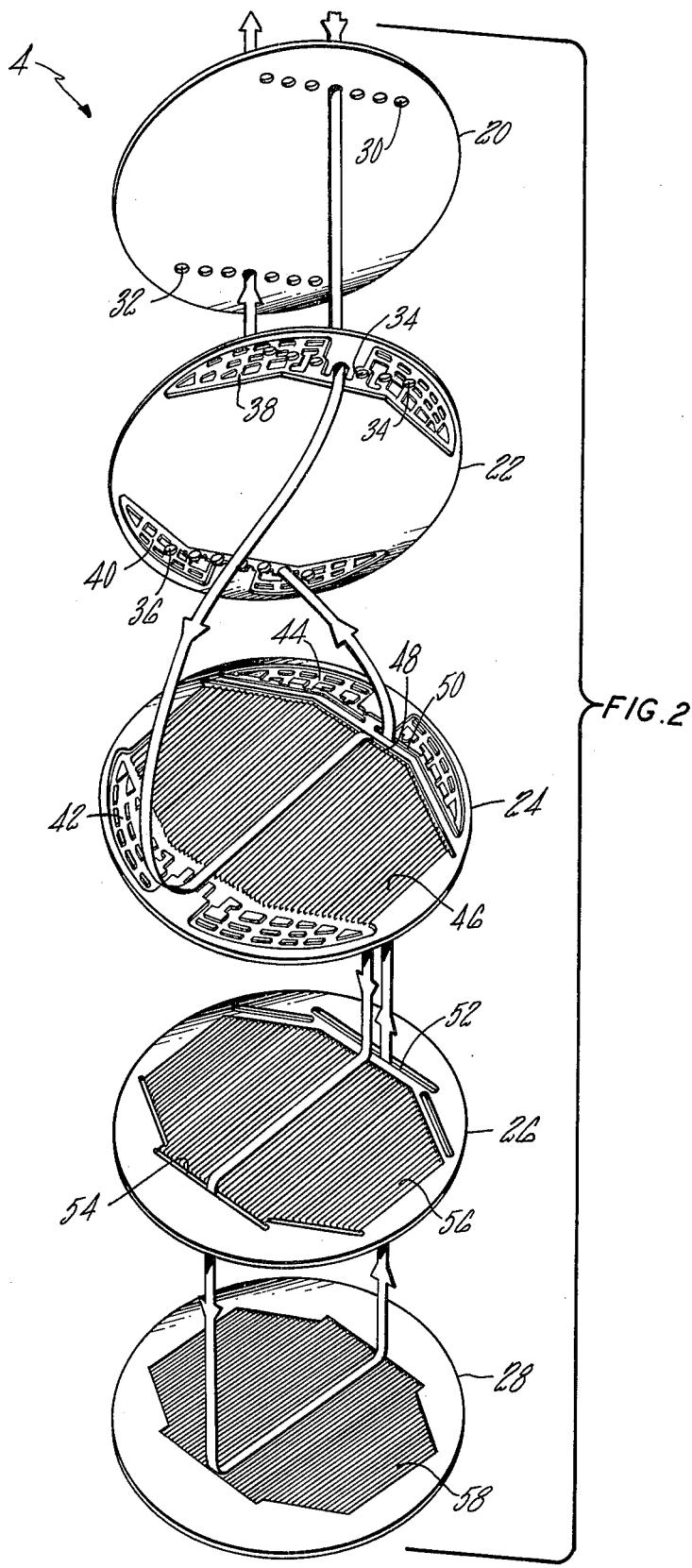
FIG. 2 is an exploded view of the face plate assembly showing the construction of each of the five plates.

In operation, coolant enters the inlet coolant manifold and is directed to openings 30 in plate 20. It can be seen in FIG. 2 that a coolant fluid passes through openings 30 and through openings 34 into the manifold areas formed by the mating manifold sections 38 and 42. The coolant then flows through grooves 46 to elongated slot means 48 where it passes through the slot means 48 to grooves 56; it then passes along grooves 56 to elongated slot means 54. The flow then goes through elongated slot means 54 to grooves 58 where it flows to the opposite ends thereof to and through elongated slot means 52. From elongated slot means 52, the coolant passes through elongated slot means 50 where it enters the manifold area between the manifold sections 44 and 40. The coolant then flows through openings 36 to openings 32 and outward through the outlet coolant manifold.

It is noted that an elongated slot means can be constructed of one long slot or several lengths of short slots.

I claim:

1. In combination in a coolant laser mirror, a face plate assembly, a rear closure plate, metal substrate fixed between said face plate assembly and closure plate, said metal substrate being comprised of a lightweight metal core, spaces being located between said face plate assembly and closure plate at opposite sides thereof, manifold means connected between said closure plate and face plate assembly, passageway means through said manifold means connecting the exterior of said laser mirror to said face plate assembly, said face plate assembly being of a sandwich construction having a plurality of plates, including a last plate, said last plate having a reflecting surface thereon for use in a laser device, said plates permitting many passes of a coolant fluid through the face plate assembly.

2. A combination as set forth in claim 1 wherein two of said plates have two manifold areas located on adjacent faces, said areas cooperating to form a second manifold means within the face plate assembly.

3. A combination as set forth in claim 2 wherein said second manifold means have lands extending from each of said adjacent plates which are fixed together to reduce pressure induced distortion of the plates.

4. A combination as set forth in claim 2 wherein said manifold areas are formed in relation to the passes through the face plate assembly so that the pressure loss through the laser mirror is the same regardless of the coolant path.

5. A combination as set forth in claim 4 wherein means permitting said passes through a face plate assembly comprise grooves on said plates, said grooves including different lengths.

* * * * *